United States Patent [19]

Goode

[11] Patent Number: 5,548,042
[45] Date of Patent: Aug. 20, 1996

[54] PROCESS FOR THE PRODUCTION OF POLYPROPYLENE

[75] Inventor: Mark G. Goode, Hurricane, W. Va.

[73] Assignee: Union Carbide Chemical & Plastics Technology Corporation, Danbury, Conn.

[21] Appl. No.: 293,473

[22] Filed: Aug. 19, 1994

[51] Int. Cl.$^6$ .............................. C08F 2/34; C08F 2/40; C08F 10/06
[52] U.S. Cl. .............................. 526/65; 526/82; 526/83; 526/84; 526/85; 526/348; 526/351; 526/901
[58] Field of Search .............................. 526/65, 82, 348, 526/351, 901, 83, 84, 85

[56] References Cited

U.S. PATENT DOCUMENTS

| | | | |
|---|---|---|---|
| 4,739,015 | 4/1988 | Toyota et al. | 525/270 |
| 4,882,380 | 11/1989 | Ficker et al. | 525/53 |
| 5,066,736 | 11/1991 | Dumain et al. | 526/82 |

FOREIGN PATENT DOCUMENTS

| | | |
|---|---|---|
| 376559 | 7/1990 | European Pat. Off. . |
| 225099 | 1/1992 | European Pat. Off. . |
| 503791 | 9/1992 | European Pat. Off. . |
| 534405 | 3/1993 | European Pat. Off. . |
| 558987 | 9/1993 | European Pat. Off. . |
| 152116 | 6/1989 | Japan . |
| 09507943 | 3/1995 | WIPO . |

*Primary Examiner*—Thomas R. Weber
*Attorney, Agent, or Firm*—Saul R. Bresch

[57] ABSTRACT

A process comprising contacting propylene in two reaction zones connected in series, under gas phase polymerization conditions, with a transition metal catalyst system comprising (a) introducing the catalyst into the first reaction zone;

(b) partially deactivating the catalyst and simultaneously increasing the monomer level to achieve a desired resin productivity in the first zone; and (c) transferring resin together with catalyst from the first zone to the second zone having purged the deactivator or added activator in sufficient amount to achieve a desired resin productivity in the second zone.

8 Claims, No Drawings

PROCESS FOR THE PRODUCTION OF POLYPROPYLENE

TECHNICAL FIELD

This invention relates to a process for the multistage production of polypropylene in which the activity of the catalyst is maintained from stage to stage.

BACKGROUND INFORMATION

In U.S. Pat. No. 5,093,415, a process is provided for producing stereoregular polymers. More particularly, it was found that polymers having an isotactic index of at least 96 percent could be prepared in high yield at high production rates by polymerizing an alpha-olefin in a low pressure gas phase fluidized bed process at temperatures in excess of 50° C. employing a catalyst system comprising (i) a solid catalyst precursor, which includes magnesium, titanium, halogen, and an inside electron donor, i.e., a polycarboxylic acid ester containing two coplanar ester groups attached to adjacent carbon atoms; (ii) a hydrocarbylaluminum cocatalyst; and (iii) an outside electron donor or selectivity control agent, i.e., a silicon compound containing a silicon-oxygen-carbon linkage wherein the atomic ratio of aluminum to silicon is in the range of about 0.5:1 to about 100:1 and the atomic ratio of aluminum to titanium is in the range of about 5:1 to about 300:1.

This catalyst system can be used to provide homopolymers of propylene and copolymers of propylene and one or more alpha-olefins. The high activity at temperatures in the range of about 50° C. to about 110° C. makes this catalyst system and similar catalyst systems using mono- and polycarboxylic acid esters as the inside and outside electron donors such as those mentioned in U.S. Pat. Nos. 4,414,132 and 4,882,380 very attractive; however, in the quest for bimodal or multimodal molecular weight distribution polypropylenes, it is desired to use these catalyst systems in multistage processes. A problem then arises as to how to maintain catalyst activity from stage to stage.

The addition of new catalyst precursor to each stage has been suggested. There is no question that this provides both the requisite catalyst activity and resin productivity in each stage, but, unfortunately, this practice generally leads to the production of a disparate blend of polymer particles, which exhibit poor product performance when compared to the blend produced when the precursor is added only to the first stage, and the first stage catalyst precursor residue is transferred from stage to stage.

DISCLOSURE OF THE INVENTION

An object of this invention, therefore, is to provide a process for the production of polypropylene in a multistage reactor configuration wherein new catalyst precursor is introduced into the first stage only, and the catalyst activity is maintained at a predetermined level from stage to stage.

Other objects and advantages will become apparent hereinafter.

According to the present invention, a process for the production of polypropylene has been discovered comprising continuously contacting propylene or a mixture comprising propylene and one or more other alpha-olefins, in two or more reaction zones connected in series, under gas phase polymerization conditions, with a catalyst system comprising (i) a solid particulate catalyst precursor, which includes magnesium; titanium; a halogen which is chlorine, bromine, or iodine, or mixtures thereof; and, as an inside electron donor, a carboxylic acid ester; (ii) a hydrocarbylaluminum cocatalyst; and (iii) as an outside electron donor, a silicon compound containing at least one silicon-oxygen-carbon linkage or a carboxylic acid ester, subject to the following conditions:

(a) introducing the catalyst precursor into the first reaction zone only;

(b) in the first reaction zone or in a first series of two or more reaction zones, partially deactivating the catalyst precursor with a deactivator and simultaneously increasing the monomer level wherein the deactivation and the increase in monomer level are effected in sufficient amounts to achieve a desired resin productivity in the first reaction zone(s);

(c) transferring the resin product together with the catalyst precursor residue from the first reaction zone or the last reaction zone of the first series of reaction zones to a second reaction zone (A) having purged the deactivator in a purge zone prior to the entry of the precursor residue into the second reaction zone and/or (B) adding cocatalyst, as an activator, and/or another activator to the purge zone or the second reaction zone wherein the activation is effected in sufficient amount to achieve a desired resin productivity in the second reaction zone; and (d) optionally, repeating steps (b) and/or (c) in one or more succeeding reaction zones.

DESCRIPTION OF THE PREFERRED EMBODIMENT(S)

The solid particulate catalyst precursor, a complex, can be prepared by halogenating a magnesium compound of the formula MgRR' wherein R is an alkoxide or aryloxide group and R' is an alkoxide or aryloxide group or a halogen with a halogenated tetravalent titanium compound containing at least two halogen atoms in the presence of a halohydrocarbon and a monocarboxylic acid ester or polycarboxylic acid ester containing two coplanar ester groups attached to adjacent carbon atoms. The alkoxide groups can contain 1 to 8 carbon atoms and the aryloxide groups 6 to 10 carbon atoms. The halogen can be chlorine, bromine, or iodine.

Suitable magnesium compounds are magnesium diethoxide, magnesium diisopropoxide, magnesium di-n-butoxide, magnesium diphenoxide, magnesium dinaphthoxide, ethoxy magnesium isobutoxide, ethoxy magnesium phenoxide, naphthoxy magnesium isoamyloxide, ethoxy magnesium bromide, isobutoxy magnesium chloride, phenoxy magnesium iodide, cumyloxy magnesium bromide, and naphthoxy magnesium chloride.

The halogenated tetravalent titanium compound contains at least two halogen atoms and can have up to two alkoxy and/or aryloxy groups. Examples are $TiCl_4$, $TiBr_4$, diethoxy titanium dibromide, isopropoxy titanium triiodide, dihexoxy titanium dichloride, and phenoxy titanium trichloride.

The halohydrocarbon, while preferably aromatic, can be aliphatic or alicyclic. Suitable halohydrocarbons are chlorobenzene, bromobenzene, dichlorobenzene, dichlorodibromobenzene, chlorotoluene, dichlorotoluene, chloronaphthalene, dibromomethane, trichloromethane, 1,2-dichloroethane, trichloroethane, dichlorofluoroethane, hexachloroethane, trichloropropane, chlorobutane, dichlorobutane, chloropentane, trichlorofluorooctane, tetrachloroisooctane, dibromodifluorodecane, dibromocyclobutane, and trichlorocyclohexane.

The halogenated tetravalent titanium compound and the halohydrocarbon preferably contain no more than 12 carbon atoms.

The carboxylic acid esters can be polycarboxylic acid esters or monocarboxylic acid esters. These carboxylic acid esters can be used as inside or outside electron donors. The outside electron donors are also known as selectivity control agents.

Suitable polycarboxylic acid esters can be characterized by a molecularly rigid structure wherein two ester groups are attached to adjacent carbon atoms of the molecule and lie in a single plane. Such esters include polycarboxylic acid esters containing two ester groups which are attached to (a) ortho carbon atoms of a monocyclic or polycyclic aromatic ring, each of said ester groups being further linked to a branched or unbranched chain hydrocarbon radical; (b) vicinal carbon atoms of a non-aromatic monocyclic or polycyclic ring and which lie in a syn configuration with respect to each other, each of said ester groups being further linked to a branched or unbranched chain hydrocarbon radical; or (c) vicinal double bonded carbon atoms of an unsaturated aliphatic compound and which lie in a syn configuration with respect to each other, each of said ester groups being further linked to a branched or unbranched chain hydrocarbon radical.

These polycarboxylic acid esters can be derived from a polycarboxylic acid and a monohydric alcohol having a linear hydrocarbon moiety which may be branched or unbranched. Examples of polycarboxylic acid esters are dimethyl phthalate, diethyl phthalate, di-n-propyl phthalate, diisopropyl phthalate, di-n-butyl phthalate, diisobutyl phthalate, di-tertobutyl phthalate, diisoamyl phthalate, di-tert-amyl phthalate, dineopentyl phthalate, di-2-ethylhexyl phthalate, di-2-ethyldecyl phthalate, diethyl-1,2-fluorenedicarboxylate, diisopropyl-1,2-ferrocenedicarboxylate, cis-diisobutyl-cyclobutane-1,2-dicarboxylate, endo-diisobutyl-5-norbornene-2,3-dicarboxylate, endo-diisobutyl-bicyclo [2.2.2]oct- 5-ene-2 -3-dicarboxylate, diisobutyl maleate, and diisoamyl citraconate.

Examples of monocarboxylic acid esters are as follows: ethyl and methyl benzoate, p-methoxy ethyl benzoate, p-ethoxy methyl benzoate, p-ethoxy ethyl benzoate, ethyl acrylate, methyl methacrylate, ethyl acetate, p-chloro ethyl benzoate, p-amino hexyl benzoate, isopropyl naphthenate, n-amyl toluate, ethyl cyclohexanoate and propyl pivalate.

Halogenation of the magnesium compound is effected employing an excess of titanium compound, about 2 moles to about 100 moles of titanium compound per mole of magnesium compound. The halohydrocarbon is employed in an amount sufficient to dissolve the titanium compound and the ester, and to adequately disperse the solid, insoluble magnesium compound. The magnesium compound can be used in an amount of about 0.005 to 2.0 moles of magnesium compound per mole of halohydrocarbon and the ester in an amount of about 0.0005 to about 2.0 moles of ester per mole of titanium compound. The halogenation of the magnesium compound can be carried out in a temperature range of about 60° C. to about 150° C. over a period of about 0.1 to about 6 hours. The halogenated product is a solid material which can be isolated from the liquid reaction medium by filtration or decantation. After separation, it is treated one or more times with the titanium compound in the same molar ratio to remove residuals and maximize catalyst activity. The halohydrocarbon is usually employed during this treatment to dissolve the titanium compound and disperse the halogenated product. The treatment is preferably carried out twice, the second treatment being in the presence of a polycarboxylic acid halide containing two coplanar acid groups attached to adjacent carbon atoms where the electron donor is a polycarboxylic acid ester. About 5 to about 200 millimols of acid halide are generally employed per gram atom of magnesium. Suitable acid halides include phthaloyl dichloride, 2,3-naphthalene di-carboxylic acid dichloride, endo-5-norbornene- 2,3-dicarboxylic acid dichloride, maleic acid dichloride, and citraconic acid dichloride.

After the solid halogenated product has been treated one or more times with additional halogenated tetravalent titanium compound, it is separated from the liquid reaction medium, washed with an inert hydrocarbon to remove unreacted titanium compounds, and dried. The final washed product suitably has a titanium content of about 0.5 percent by weight to about 6.0 percent by weight. The atomic ratio of titanium to magnesium in the final product is in the range of about 0.01:1 to about 0.2:1. The carboxylic acid ester can be present in the solid catalyst precursor in a molar ratio of ester to magnesium of about 0.005:1 to about 10:1.

The hydrocarbyl aluminum cocatalyst can be represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be alike or different; and each R, which is a hydrocarbyl radical, has 1 to 20 carbon atoms, and preferably 1 to 10 carbon atoms. Further, each alkyl radical can be straight or branched chain and such hydrocarbyl radical can be a mixed radical, i.e., the radical can contain alkyl, aryl, and/or cycloalkyl groups. Examples of suitable radicals are: methyl, ethyl, propyl, isopropyl, butyl, isobutyl, tert-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, dodecyl, phenyl, phenethyl, methoxyphenyl, benzyl, tolyl, xylyl, naphthyl, naphthal, methylnaphthyl, cyclohexyl, cycloheptyl, and cyclooctyl.

Examples of suitable hydrocarbyl aluminum compounds are as follows: triisobutylaluminum, trihexylaluminum, diisobutylaluminum hydride, dihexylaluminum hydride, isobutylaluminum dihydride, hexylaluminum dihydride, dioisobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolyl-aluminum. The preferred hydrocarbyl aluminums are triethylaluminum, triisobutylaluminum, trihexylaluminum, di-isobutylaluminum hydride, and dihexylaluminum hydride.

The other selectivity control agent, which can be used in the process is a silicon compound. The silicon compounds include compounds having the formula $R_aSiY_bX_c$ wherein R is a hydrocarbon radical having 1 to 20 carbon atoms; Y is —OR or —OCOR; and X is hydrogen, chlorine, bromine, or iodine; each R and Y are the same or different; a is an integer from 0 to 3; b is an integer from 1 to 4; c is 0 or 1; and $a+b+c=4$. R can be substituted or unsubstituted. Silicon compounds containing Si—O—Si groups can also be employed providing that at least one Si—O—C group is present. Examples of useful silicon compounds are diphenyldimethoxysilane, n-propyltrimethoxy-silane, di-tert-butyldimethoxysilane, diphenyldiisobutoxysilane, diisobutyldimethoxysilane, and dimethyldiethoxysilane.

As noted, the process of the invention is a multistage process, which simply means that the process is carried out in two or more stages. A multistage reactor configuration can be set up using the same reactor for each stage; a part of a reactor for each stage; or one reactor per stage. In this specification, each stage may be referred to as a "reaction zone". Preferably, two or three stages or reaction zones are used in the process. The stages or reaction zones are connected in series. In condition (b), partial deactivation is effected in the first reaction zone or in a first series of two or more reaction zones, which can include the first reaction zone. This is demonstrated in examples 3 to 6 below wherein the deactivation takes place in the first two reactors followed by reactivation in the third reactor. As a practical matter, meaningful results will probably not be achieved with partial deactivation beyond the third or fourth reactor in a series without reactivation.

The polymer is prepared in the gas phase, preferably, by continuously contacting the catalyst system described above with propylene or a mixture of comonomers comprising propylene and one or more other alpha-olefins in two or more fluidized bed reactors such as that described in U.S. Pat. No. 4,482,687 or in two or more other conventional reactors for the gas phase production of, for example, propylene homopolymers or copolymers.

In a fluidized bed or another gas phase reactor, there usually is a catalyst precursor feed line or another suitable conduit such as an injection tube through which the particulate precursor is flushed into the reactor using a small portion of the liquid propylene as a carrier. The portion of the liquid propylene used for this purpose in large scale equipment can be about 0.1 to about 11 percent by weight based on the weight of the total liquid propylene introduced into the reactor, and is preferably about 0.15 to about 7.5 percent by weight. In pilot plant operations the portion of the liquid propylene used for this purpose is about 20 to 50 percent. The flow rate of this liquid carrier usually has a Reynolds number greater than about 15,000, preferably greater than about 20,000. The Reynolds number preferred range is about 20,000 to about 400,000. The Reynolds number, as it is used in context, is described in the Chemical Engineers Handbook, 5th Edition, edited by Perry et al, publ. by McGraw Hill, New York, 1973, Section 5, page 4.

In this specification, the term "copolymer" is considered to mean a polymer based on propylene and one or more comonomers. The alpha-olefin comonomers can have 2 or 4 to 12 carbon atoms. Additional comonomers such as conjugated or non-conjugated dienes containing 5 to 25 carbon atoms can also be included in the mixture of comonomers to be polymerized. Useful alpha-olefins preferably do not contain any branching on carbon atoms closer than two carbon atoms removed from the double bond. Examples of suitable alpha-olefins include ethylene, 1-butene, 1-hexene, 4-methylpentene-1, 1-heptene, and 1-octene. Examples of the dienes are 1,4-pentadiene, 1,4-hexadiene, 1,5-hexadiene, dicyclopentadiene, cyclohexadiene, 1-vinyl-1-1-cyclopentene, and the alkylbicyclononadienes, indenes, and norbornenes. Ethylidene norbornene is an example of the latter. The non-conjugated dienes are preferred.

The in situ blend formed in this multistage process can be a homopolymer/copolymer blend or a copolymer/copolymer blend. One particular combination is referred to as an impact polypropylene copolymer such as the one described in U.S. Pat. No. 4,882,380. Generally, in the copolymer, the portion attributed to propylene can be in the range of about 80 to about 99.5 percent by weight based on the weight of the copolymer and is preferably in the range of about 85 to about 99.5 percent by weight; the portion attributed to the second comonomer can be in the range of about 0.5 to about 20 percent by weight and is preferably in the range of about 0.5 to about 15 percent by weight; and the portion attributed to other comonomers, if any, can be in the range of about 0.5 to about 20 percent by weight. All percentages are based on the weight of the copolymer. The copolymers are preferably propylene/ethylene copolymers and propylene/1-butene copolymers, the ethylene or 1-butene being present in an amount of about 3 to about 15 percent by weight based on the weight of the copolymer, and the balance of the copolymer being propylene.

The amount of resin (by weight) produced in each stage is usually given in terms of a weight ratio. This ratio is referred to as the split ratio. Thus, in a two stage process, the split ratio between the first and second stages can be 5:95 to 95:5, and in a three stage process, the split ratio between the first, second, and third stages can be 5:5:90 to 90:5:5 with many variations. The split can be controlled by the basic process of the invention, but, as an auxiliary control, the residence time in each stage can be adjusted by the addition of a dense non-reactive gas such as propane to the stage where the adjustment is desired, by the manipulation of the superficial gas velocity of the fluidizing gas, again in the stage where the adjustment is desired, or by changing the height of the fluid bed in the stage where the adjustment is desired.

The dense non-reactive gas increases the density of the gases in the reactor. This, in turn, decreases the fluidized bulk density of the polymer particles in the reactor which then decreases the residence time of the polymer in the reactor. The decrease in residence time is almost inversely proportional to the increase in the density of the gases in the reactor. It is important that the dense gas be free of deactivating compounds. Thus, purification may be required. There can be a separate purification train or the propane may be purified with the propylene in its purification train, i.e., propane addition to the propylene prior to purification. If propane is not readily available, propylene can be hydrogenated to propane using one of the commercially available catalysts and hydrogen. While propane is the preferred dense gas, argon, xenon, butane, and pentane are examples of other suitable dense gases.

With regard to superficial gas velocity, an increase in same results in a decrease in residence time due to the decrease in the fluidized bulk density of the polymer particles. This technique is particularly useful when it is desired to produce a very small amount of resin in a particular reactor. Yet, there are additional costs for the purchase of a blower capable of a broad range of superficial gas velocities. The operational costs are also higher due to reduced blower efficiencies.

Changing the height of the fluidized bed proportionally changes the amount of resin in the reactor. Experience has shown that operation at low and high bed levels for extended times can lead to poor reactor operation, i.e., catalyst hot spotting and resin chunk formation in the bed and on the sloped walls of the reactor transition zone to the expanded section. The optimal bed level for stable reactor operation is about one foot below the beginning of the transition to the expanded section. Thus, the fluidized bed reactors are essentially fixed volume reactors.

As noted in step (b), above, the catalyst precursor is partially deactivated and simultaneously the monomer level is increased wherein the deactivation and the increase in monomer level are effected in sufficient amounts to achieve the desired resin productivity. The partial deactivation is accomplished by introducing a deactivating compound (deactivator) into the reaction zone(s). The deactivating compound can be one that has to be purged from the resin in order to avoid its deactivating effect, or one that is considered reversible, i.e., a deactivating compound whose deactivating effect can be nullified by the introduction of an activating compound (activator). In this step, the catalyst precursor can be deactivated by about 5 to about 90 percent and the monomer level can be increased by about 5 to about 500 percent based upon the normal activity for said catalyst precursor and the corresponding normal monomer level.

Various deactivating compounds or "activity retarders" are mentioned in U.S. Pat. No. 5,066,736. They are also known as poisons or kill agents. Generally, the deactivating compounds which must be purged are those such as carbon monoxide which do not react with the aluminum alkyls, the conventional reactivating compounds. Other deactivating compounds react mildly with the aluminum alkyls, such as carbon dioxide, nitrogen monoxide and sulfur dioxide, and can be purged from the resin and/or reactivated with activating compounds. Other deactivating compounds may react more strongly with the aluminum alkyl such as organic carbonyls including esters, ethers, alcohols, aldehydes, and ketones, and sulfides, water, oxygen, amines, and phthalate compounds. They may be purged to a degree from the resin, yet generally require the addition of an activator to restore the residual catalyst productivity. It should be noted that oxygen and water may be deleterious to the operation of the polymerization reactor(s) because of the possibility of "sheeting". Other deactivating compounds such as silicon containing carbonyl compounds, which have other uses in the polymerization reactor, can be used for the purpose of deactivation if the dual purpose can be accommodated.

In addition to the cocatalysts mentioned above, the following additional activators can be mentioned: alkyl lithium compounds, alkyl zinc compounds such as diethyl zinc, alumoxane compounds, and alkylaluminum halides such as diethylaluminum chloride (DEAC).

Residual catalyst productivity is that remaining capacity of the catalyst to polymerize monomers in the absence of deactivating agents. The productivity of the catalyst may decay with time such that insufficient productivity remains to make the required amount of polymer in the last reactor when the overall residence time is too long.

To achieve the desired productivity in the first reactor, the monomer level is increased beyond the amount sufficient to counter the effect on productivity of the deactivation. This is necessary because the resulting decrease in the first reactor residence time passes increased levels of reactive catalyst to the second reactor. The resulting increase in catalyst productivity in the second reactor means that a greater fraction of the polymer is made there, and requires that the monomer levels in the first reactor be increased to maintain the desired split between reactors. The amount of deactivating agent and monomer level in the first reactor incrementally increases until a constraint is reached such as the maximum working pressure of the reactor vessel, excessive condensation of the cycle gas, or that the polymer fluidized bulk density approaches the minimum level required for stable fluidization, i.e., about six pounds per cubic foot. Operation at the highest allowable monomer pressure in the first reactor insures the optimum catalyst productivity and the minimum polymer average residence time for the overall process. The optimal amount of deactivating agent added to the reactor corresponds to operation at the highest monomer level in the first reactor. At these conditions, monomer levels in both reactors are at the highest allowable levels. Further increases in the amount of deactivating agent result in decreased production in the first reactor such that the overall productivity of the catalyst is sacrificed in order to produce the desired split of polymer in each reactor. For best performance, the monomer level in the second reactor should be near the maximum level.

To achieve the desired productivity in the second reactor, the purge and/or reactivation is effected in sufficient amount to restore the level of activity of the catalyst precursor. Additionally, the amount of polymer produced in the second reactor increases due to the decreased average residence time of the catalyst in the first reactor. The monomer level in the second reactor generally remains unaltered because it is already near the highest allowable level. If not, the monomer level is increased to the maximum level to insure the best overall catalyst productivity for the process. The purge and/or reactivation preferably restores all of the remaining catalyst productivity for best performance, but there are still advantages if only a portion is restored, i.e., 80 percent in the provided example.

It is possible to control the fraction of polymer made in each reactor by manipulating the purge or reactivation in the second reactor, or by controlling the partial pressure in the second reactor. It is also possible to control the split by manipulating the amount of deactivating agent added to the first reactor or by fixing the amount of deactivating agent and controlling the monomer level in the first reactor. A combination of these techniques can be used for process control, but the best catalyst productivity and minimum overall residence time is achieved when both reactors operate near their maximum allowable monomer levels and the residual productivity of the catalyst is fully recovered in the second reactor.

The purge of volatile deactivating compounds is carried out in a conventional manner in a purge zone between the first reactor and the second reactor with an inert gas such as nitrogen, methane, or ethane. The inert gas may be combined with one or more of the gaseous monomers. The purge may also be achieved using one or more of the monomers or hydrogen. Deactivating compounds of high and low volatility can also be treated with counteragents such as the alkyl aluminum activating compounds or other activators in this purge zone prior to entry into the second reactor.

A preferred deactivating compound is a phthalate compound, which is introduced into the first reactor when it is desired to partially deactivate the catalyst precursor. A sufficient amount of phthalate compound is used to accomplish the desired deactivation. The rate of introduction is selected to accomplish the same end. It is preferred to add the deactivating compound continuously, but the deactivating compound can also be introduced intermittently. The amount can be in the range of about 50 to about 500 ppmw (parts per million by weight) based on one million parts by weight of polymer product in the first reactor, and is preferably in the range of about 75 to about 300 ppmw. These ranges achieve the desired partial deactivation or the catalyst. The phthalate compound is preferably a dialkyl phthalate wherein each alkyl independently can have 1 to 10 carbon atoms and preferably has 1 to 6 carbon atoms. Preferred phthalate compounds are diisobutyl phthalate (DIBPH) and diethyl phthalate (DEPH). Other suitable phthalate compounds are mentioned above in the paragraph dealing with polycarboxylic acid esters. The phthalate compounds are considered to be reversible deactivating compounds. It is noted that the phthalate compound acts like a selectivity control agent on resin properties in that it decreases xylene solubles and decreases the hydrogen chain transfer rate. DIBPH, particularly, is non-toxic and stable so it is safe to add this material to the resin in small quantities.

In order to reactivate the catalyst precursor, the cocatalyst and/or another activator, which may be the selectivity control agent, are added to the second reactor in an amount in the range of about 5 to about 500 ppmw (parts per million by weight) based on one million parts by weight of polymer product in the second reactor, and is preferably in the range of about 50 to about 200 ppmw.

Another preferred deactivating agent is an ether. The ether can be cyclic or acyclic such as cycloalkyl and alkyl ethers, and can have 2 to 20 carbon atoms. A preferred ether is tetrahydrofuran, but other commonly used ethers such as diethyl ether, dimethyl ether, dioxane, methyl t-butyl ether, glyme, and diglyme can be used. The ether is introduced into the first reactor when it is desired to partially deactivate the catalyst precursor. A sufficient amount of the ether is used to accomplish the partial deactivation. The amount of ether is geared to the total amount of aluminum in the process, i.e., the amount of cocatalyst and other aluminum compounds present in the reactor. The ether can be introduced in a molar ratio of ether to aluminum of at least about 0.01:1, and is preferably provided in a molar ratio of ether to aluminum in the range of about 0.05:1 to about 2:1. The ether can be introduced neat or in a mixture with a low boiling hydrocarbon such as isopentane into the recycle line or directly into the reactor. Just as the phthalate compound, the ether is a reversible deactivating compound. Thus, a purge is not necessary.

In order to reactivate the catalyst precursor in the second reactor, one or more aluminum alkyl compounds such as those aluminum alkyls mentioned above as cocatalysts can be added to the reactor in a sufficient amount to re-start the polymerization. Other activators can also be used to accomplish the reactivation. A molar ratio of aluminum to ether of at least about 0.1:1 can be used to carry out this task; a preferred molar ratio is in the range of about 0.5:1 to about 2:1. It can be added directly to the fluidized bed of the second reactor; to the recirculation loop for the polymerization gas; or to the purge zone. The less ether used, the less aluminum alkyl will be needed to reactivate the catalyst precursor in the second reactor.

Another preferred deactivating agent is carbon monoxide. Carbon monoxide is introduced into the first reactor when it is desired to partially deactivate the catalyst precursor and a sufficient amount is used to accomplish the partial deactivation. It is preferred to add the carbon monoxide continuously, but it can also be introduced intermittently. The amount of carbon monoxide is geared to the total amount of titanium in the process, i.e., the amount of catalyst present in the reactor. Carbon monoxide can be introduced in a molar ratio of carbon monoxide to titanium of at least about 0.01:1, and is preferably provided in a molar ratio of ether to aluminum in the range of about 0.05:1 to about 2:1. Carbon monoxide can be introduced as a pure gas or as mixture in an inert gas such as nitrogen into the gas recycle line or directly into the reactor. In order to reactivate the catalyst precursor in the second reactor, the carbon monoxide is purged from the resin transferred from the first to the second reactor.

A typical two reactor process for the preparation of a bimodal molecular weight distribution polymer can be described as follows. The deactivation and the reactivation have already been described above and will not be repeated. In this case, a low melt flow polymer is produced in the first reactor and a high melt flow polymer is produced in the second reactor, but this can be reversed if desired, and various combinations can be obtained in three or more reactors. Another typical case is the preparation of a polypropylene impact copolymer with polypropylene homopolymer or random copolymer prepared in the first reactor and a propylene-alpha-olefin copolymer of lower melt flow prepared in the second reactor.

For the first case, a relatively low melt flow (or high molecular weight) homopolymer or copolymer is prepared in the first reactor. The mixture of polymer and active catalyst precursor residue is usually transferred from the first reactor to the second reactor via an interconnecting device using nitrogen or second reactor recycle gas as a transfer medium.

The low melt flow can be in the range of about 0.01 to about 2.0 gram per 10 minutes, and is preferably in the range of about 0.10 to about 1.0 gram per 10 minutes. Melt flow is determined under ASTM D-1238, Condition E. It is measured at 230° C. and 2.16 kilograms and reported as grams per 10 minutes. Melt flow can also be referred to as melt index; however, in defining melt flow, the temperature and kilograms must be specified.

A relatively high melt flow (or low molecular weight) homopolymer or copolymer is prepared in the second reactor. The high melt flow can be in the range of about 50 to about 1000 gram per 10 minutes, and is preferably in the range of about 100 to about 500 gram per 10 minutes.

The blend or final product, as removed from the second reactor, can have a melt flow in the range of about 0.5 to about 50 grams per 10 minutes, and preferably has a melt flow in the range of about 2 to about 20 grams per 10 minutes. The blend has a broad molecular weight distribution.

The catalyst precursor, propylene, alpha-olefin(s), if any, and hydrogen are continuously fed into the first reactor; the polymer/catalyst precursor mixture is continuously transferred from the first reactor to the second reactor; propylene, alphaolefin(s), if any, and hydrogen, as well as cocatalyst and selectivity control agent are continuously fed to the second reactor. The final product is continuously removed from the second reactor.

In the first reactor:

The mole ratio of alpha-olefin to propylene can be in the range of up to about 0.5:1, and, if alpha-olefin is used, is preferably in the range of about 0.0:1 to about 0.2:1. It should be pointed out here that it is not necessary to use an alpha-olefin in the first reactor. This would be the case where it is desired to make a homopolymer of propylene in this reactor. The mole ratio of hydrogen to ethylene can be in the range of about 0.0005:1 to about 0.5:1, and is preferably in the range of about 0.005:1 to about 0.1:1. The operating temperature is generally in the range of about 50° to about 90° C. Preferred operating temperatures vary depending on the comonomer level desired in the polymer, i.e., lower temperatures for higher comonomer levels and higher temperatures for lower comonomer levels.

In the second reactor:

The mole ratio of alpha-olefin to propylene can be in the range of up to about 2:1, and, if alpha-olefin is used, is preferably in the range of about 0.0:1 to about 1.5:1. It should be pointed out here that it is not necessary to use an alpha-olefin in the second reactor. This would be the case where it is desired to make a homopolymer of propylene in this reactor. It should also be pointed out that the higher mole ratios of alpha-olefin to propylene correspond to the production of the rubber portion of an impact copolymer, and for such polymers, the melt flow in the second reactor is lower than in the first reactor. The mole ratio of hydrogen to propylene can be in the range of about 0.0005:1 to about 1:1, and is preferably in the range of about 0.01:1 to about 0.5:1. The operating temperature is generally in the range of about 50° to about 90° C. As mentioned above, the temperature is preferably varied with the desired comonomer content of the polymer.

The pressure is not generally the same in both the first and second reactors. The total pressure can be in the range of about 100 to about 600 psig and is preferably in the range of about 200 to about 500 psig. In the case of a polypropylene homopolymer, the partial pressure of the propylene can be in the range of about 50 to about 450 psi and is preferably about 200 to about 400 psi. In the case of a copolymer, the partial pressure of the propylene can be reduced to the range of about 5 to about 450 psi and is preferably about 15 to 350 psi. The lower propylene partial pressures in the copolymer case corresponds to small amounts of the copolymer present in the final product, or copolymers that contain a higher fraction of more reactive comonomer, such as ethylene. The partial pressure of the second comonomer, if used, can be in the range of about 1 to about 150 psi and is preferably about 1 to about 100 psi. The total partial pressure of other comonomers, if used, can be about 1 to about 200 psi. The superficial gas velocity, which can be calculated by measuring cycle gas flow, is, generally, maintained in the range of about 0.8 to about 2.5 feet per second and is preferably in the range of about 0.9 to about 1.6 feet per second. The superficial gas velocity is preferably used together with a slow transition in polymerization conditions in order to optimize the results. As noted above, however, the superficial gas velocity can be manipulated in order to control residence time in any one reactor.

The residence time of the alpha-olefin(s) in the reactor can be in the range of about 0.5 to about 4.0 hours and is preferably in the range of about 1.0 to about 2.0 hours, but this is subject to adjustment in order to achieve the desired productivity in each reactor. Hydrogen or another chain transfer agent can be used in the process. The molar ratio of hydrogen to alpha-olefin used in the fluidized bed reactor can be in the range of about 0.0005:1 to about 1:1 and is preferably in the range of about 0.005:1 to about 0.5:1. This translates into a hydrogen partial pressure in the range of less than about 1 psi to about 200 psi. The balance of the operating pressure utilized in the reactor, i.e., after the partial pressure of propylene, other comonomers, and the hydrogen partial pressure are considered, can be made up by using an inert gas such as nitrogen or propane.

The atomic or molar ratios of catalyst components can be about as follows:

| Ratio | Broad Range | Preferred Range |
| --- | --- | --- |
| Mg to Ti | 1:1 to 50:1 | 3:1 to 30:1 |
| Halogen to Mg | 1.1 to 5:1 | 2:1 to 3:1 |
| Mg to inside electron donor | 0.1:1 to 100:1 | 1:1 to 60:1 |
| Al to Ti | 5:1 to 300:1 | 10:1 to 200:1 |
| Al to selectivity control agent (SCA) | 0.5:1 to 100:1 | 1:1 to 75:1 |

In U.S. Pat. No. 4,414,132, there is described a catalyst system, which is similar to the catalyst system described above except that its selectivity control agent (outside electron donor) is a carboxylic acid ester. A typical example of the catalyst precursor is:

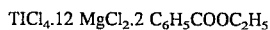

TlCl$_4$.12 MgCl$_2$.2 C$_6$H$_5$COOC$_2$H$_5$ and the selectivity control agent is para-ethoxy ethyl benzoate.

The advantages of this invention are improved catalyst productivity and reduced average residence time in linked gas phase fluidized bed polymerization reactors. This is accomplished by the addition of temporary deactivating agents to a first reactor causing an increase in the monomer level to maintain the desired catalyst productivity. This also increases the density of the fluidizing gas, and that decreases the fluidized bulk density of the particulate polymer. The result is a decrease in the average residence time of the polymer and catalyst particles in the first reactor. Therefore, because the catalyst productivity decays exponentially with time, the average residual productivity of the catalyst passed to the subsequent reactor is increased. The catalyst productivity in the second reactor is recovered by purging or by the addition of an activating agent. The invention is easy to implement and control on a commercial scale. It improves the overall economics of the process and allows the production of a broader range of products in an existing polymerization facility.

The patents mentioned in this specification are incorporated by reference herein.

The invention is illustrated by the following examples.

EXAMPLES 1 TO 6

In these examples, the production of polypropylene homopolymer has been simulated via computer models for three reactors connected in series. The split between the reactors is 52% of the product made in the first reactor, 23% made in the second and 25% made in the third reactor.

To a solution of 70 milliliters of titanium tetrachloride (120 grams, 0.64 mol) in 3.7 liters of chlorobenzene are added, in succession, 180 milliliters of diisobutyl phthalate (187 grams, 0.67 mol), 590 grams (5.2 mols) of magnesium diethoxide, and a solution of 4.7 liters of titanium tetrachloride (8100 grams, 43 mols) in 1.2 liters of chlorobenzene. A temperature of 20° C. to 25° C. is maintained during these additions. The resulting mixture is then heated to 110° C. with stirring, the temperature being maintained for 1 hour. At the end of this time, the mixture is filtered while hot. A solid material is collected.

The solid material is then slurried in a solution of 4.7 liters of titanium tetrachloride (8100 grams, 43 mols) in 1.2 liters of chlorobenzene at room temperature. A solution of 45 grams (0.22 mol) of phthaloyl dichloride in 3.7 liters of chlorobenzene is added to the slurry at room temperature, and the resulting slurry is then heated to 110° C. with stirring, the temperature being maintained for 30 minutes. At the end of this time, the mixture is filtered while hot. A solid material is collected.

The solid material is reslurried in a solution of 4.7 liters of titanium tetrachloride (8100 grams, 43 mols) in 1.2 liters of chlorobenzene at room temperature. An additional 3.7 liters of chlorobenzene is then added to the slurry at room temperature, and the resulting slurry is heated to 110° C. with stirring, the temperature being maintained for 30 minutes. At the end of this time the mixture is filtered while hot. A solid material is collected.

The solid material is reslurried once again in a solution of 4.7 liters of titanium tetrachloride (8100 grams, 43 mols) in 1.2 liters of chlorobenzene at room temperature. An additional 3.2 liters of chlorobenzene is then added to the slurry at room temperature, and the resulting slurry is heated to 110° C. with stirring, the temperature being maintained for 30 minutes. At the end of this time, the mixture is filtered while hot. The residue is washed 6 times with 500 milliliter portions of hexane at 25° C., and then dried under a nitrogen purge. The product is particulate and weighs about 500 grams. This is the solid catalyst precursor.

The particulate solid catalyst precursor is continuously into a first fluidized bed reactor through an injection tube using liquid propylene as a carrier. The portion of the total liquid propylene fed into the reactor, which is used as a catalyst precursor carrier, is about 30% percent by weight based on the weight of the total liquid propylene. Simultaneously, and continuously, triethylaluminum (TEAL) cocatalyst and n-propyltrimethoxysilane (NPTMS) as selectivity control agent (SCA) are added to the reactor (as dilute solutions in isopentane).

Additional catalyst is not added to the second and third reactors. But additional TEAL cocatalyst and NPTMS selectivity control agent are added (as dilute solutions in isopentane) to the second and third reactors when required as necessary to reverse the effects of the deactivating compound. These are added at any point to the reactor or gas recirculation line.

Liquid propylene, hydrogen, and nitrogen are added to maintain a specified pressures and concentrations in each reactor. The reactor feeds are accomplished through the use of tubes fitted with motor valves and orifices. The resin product together with the catalyst precursor residue is transferred from the first reactor to the second reactor, and the resin product from the second reactor together with the catalyst precursor residue is transferred to the third reactor. The resin product is finally discharged from the third reactor.

When used, the deactivating compound is added continuously to the first reactor or to the first and second reactors. The deactivator can be of the type that can be purged from the resin or of the type that can be reversed by the addition of an activator. For purposes of the computer simulation, it is unimportant what specific deactivator is used. The important parameters are that the poisoning be sufficient to raise the monomer to the desired level in the first reactor, and that the desired level of catalyst productivity be recovered in the subsequent reactor. The deactivator can be a gas or a liquid and can be diluted in a suitable solvent such as nitrogen or isopentane. The addition of the deactivator is accomplished through the use of tubes fitted with motor valves and orifices.

The fluidized bed reactors are 13.75 inches in internal diameter and operate with a bed height of about 8 feet. The volume of the bed is about 8.0 cubic feet. The injection tube is 3/16 inch in internal diameter and extends about 5 inches into the reactor. The propylene liquid has a density of 0.526 gram per cubic centimeter at 20° C. and 550 pounds per square inch (psi). The propylene liquid has a viscosity of 0.0735 centipoise at the same temperature and pressure.

Variables and partial results for example 1 are set forth in Table I. Variables, which differ from example 1, and a comparison of performance between the examples are set forth in Table II. The type of polymer made in each reactor in the series is a homopolymer of propylene; the temperature in each reactor is 80° C.; the minimum total pressure in each reactor is selected to be 300 psia and the maximum pressure is about 500 psia; and the bed volume in each reactor is 8 cubic feet. The maximum allowed propylene partial pressure in each reactor is selected to be 390 psi because of the maximum working pressure of the reactors and the dew point of the cycle gas mixture, i.e., to prevent the gas mixture from condensing in the fluidized bed. The minimum resin fluidized bulk density is selected to be about 6.0 pounds per cubic foot to insure stable fluidization and mixing of the bed.

Example 1 represents the production of a 52/23/25 split polypropylene homopolymer without the use of the present invention. The polymer has a trimodal molecular weight distribution because of the varying hydrogen levels in each reactor. The monomer levels in the first and second reactors are greatly depressed to achieve the desired split. The overall catalyst productivity is low and polymer average residence time is excessive.

Example 2 demonstrates the addition of a deactivating compound to the first reactor and the complete recovery of the residual catalyst productivity in the second reactor. The catalyst productivity improves and the average residence time decreases compared to example 1. The monomer level in the first reactor is increased incrementally to the maximum specified level of 390 psi as the level of deactivator is adjusted to maintain the split. Excessive poisoning of the catalyst at 390 psi will reduce the fraction of resin made in the first reactor. The fluid bulk density in the first reactor approaches the 6.0 pounds per cubic foot limit as the monomer level increases in the first reactor.

Example 3 uses deactivator in the first and second reactor with the complete recovery of the residual catalyst productivity in the third reactor. This achieves the highest catalyst productivity and minimum residence time of examples 1 to 6. The monomer levels in reactors 1 and 2 are at their maximum levels and the respective fluidized bulk densities are near the minimum. The amount of deactivator in each reactor is adjusted as the monomer level increases to maintain the desired split in each reactor. Excessive deactivation of the catalyst in both reactors is avoided. A special case exists in the second reactor in that deactivator from the first reactor can enter it with the resin from the first reactor. Additional deactivator can be added to the second reactor if the catalyst productivity is excessive there, i.e., the split in the second reactor is high. Alternatively, if required, a portion of the catalyst productivity in the second reactor may be recovered by purging the resin from the first reactor or by the addition of an activator.

Example 4 is comparative to examples 1 and 3. It demonstrates that improvements in catalyst productivity and average residence time can be achieved even with less than the optimal amount of deactivator in the reactors. Performance is less than example 3 but still much better than example 1. The lower deactivator levels result in monomer levels in the first and second reactors about 120 psi below the maximum limit, and the fluidized bulk densities about 3.5 pounds per cubic foot higher than in example 3.

Examples 5 and 6 are comparative to examples 1 and 3. They demonstrate that less than 100% recovery of the residual catalyst productivity in the last reactor still greatly improves the catalyst productivity and reduces the average residence time performance compared to example 1.

EXAMPLES 7 TO 12

In these examples, the production of polypropylene impact copolymer has been simulated via computer models for two reactors connected in series. The catalyst is the same as that described in examples 1 to 6.

The particulate solid catalyst precursor is continuously fed into a first fluidized bed reactor through an injection tube using liquid propylene as a carrier. The portion of the total liquid propylene fed into the reactor, which is used as a catalyst precursor carrier, is 2.5 percent by weight based on the weight of the total liquid propylene. Simultaneously, and continuously, triethylaluminum cocatalyst (TEAL) and n-propyltrimethoxysilane (NPTMS) as selectivity control agent (SCA) are added to the reactor (neat or as dilute solutions in isopentane).

Additional catalyst is not added to the second reactor. Additional TEAL cocatalyst and NPTMS selectivity control agent are not added to the second reactor in these examples because the deactivator is a purgable gas. Liquid propylene, hydrogen, and nitrogen are added to maintain specified pressures and concentrations in each reactor. The reactor feeds are accomplished through the use of tubes fitted with motor valves and orifices. The resin product together with the catalyst precursor residue is transferred from the first reactor to the second reactor, and finally discharged.

The deactivating compound is carbon monoxide in these examples, and is added continuously to the first reactor when used. The amount added can be calculated on an equivalence basis to the amount of carbon monoxide in the reactor propylene feed in parts per million by volume. The amount added is sufficient to raise the monomer to the desired level in the first reactor. The carbon monoxide is purged from the resin between the reactors using nitrogen, monomer or other suitable gas. The purging is sufficient to recover the desired level of residual catalyst activity. The deactivator could also have been of the type that can be reversed by the addition of an activator. The carbon monoxide is supplied as a pure gas in a high pressure cylinder or a dilute gas mixture in a suitable carrier such as nitrogen. Its addition is accomplished through the use of tubes fitted with motor valves and orifices.

The first fluidized bed reactor is 11.3 feet in internal diameter and operates with a bed height of about 40 feet. The volume of the bed is about 4000 cubic feet. The second fluidized bed reactor is 8.5 feet in internal diameter and operates with a bed height of about 35 feet. The volume of the bed is about 2000 cubic feet. The catalyst injection tube is 3/8 inch in internal diameter and extends about 2.5 feet into the reactor. The propylene liquid has a density of 0.526 gram per cubic centimeter at 20° C. and 550 pounds per square inch (psi). The propylene liquid has a viscosity of 0.0735 centipoise at the same temperature and pressure.

Variables and partial results for example 7 are set forth in Table III. Variables, which differ from example 7, and a comparison of performance between the examples are set forth in Table IV. The type of polymer made in the first reactor in the series is a homopolymer of propylene and the type of polymer made in the second reactor in the series is an ethylene-propylene rubber. The temperature in the first reactor is 65° C. and the temperature in the second is 70° C. The minimum total pressure in each reactor is selected to be 300 psia. Lower pressures can be used in actual operation, but for the purpose of the computer simulation, nitrogen is added to the reactor as necessary to achieve 300 psia. The maximum allowable pressure is 550 psia in the first reactor and 350 psia in the second. The maximum allowed propylene partial pressure is selected to be 390 psi in the first reactor. The minimum resin fluidized bulk density is selected to be about 6.0 pounds per cubic foot to insure stable fluidization and mixing of the bed.

Example 7 represents the production of a 60/40 split polypropylene impact copolymer without the use of the present invention. The superficial gas velocity in the first reactor is 1.2 feet per second and the superficial gas velocity in the second reactor is 1.5 feet per second. The monomer level in the first reactor is greatly depressed to achieve the desired split. The overall catalyst productivity is low and polymer average residence time is excessive.

Example 8 demonstrates the addition of carbon monoxide to the first reactor and the complete recovery of the residual catalyst productivity in the second reactor. The catalyst productivity improves and the average residence time decreases compared to example 7. The monomer level in the first reactor is increased incrementally to 340 psi as the level of deactivator is adjusted to maintain the split. At this monomer level, the fluidized bulk density of the resin is at the minimum allowable limit of 6.0 pounds per cubic foot. Further increases in monomer level can result in fluidization instability due to the low fluidized bulk density.

Example 9 is comparative to examples 7 and 8. It demonstrates that less than 100 percent recovery of the residual catalyst productivity in the last reactor still greatly improves the catalyst productivity and reduces the average residence time performance compared to example 7.

Examples 10, 11, and 12 are similar to examples 7, 8, and 9 except for a lower superficial gas velocity in the first reactor, 0.9 foot per second versus 1.2 feet per second. The superficial gas velocity in the second reactor is the same at 1.5 ft/sec. Examples 11 and 12 use carbon monoxide to improve performance; example 10 does not. The recovery of the residual catalyst productivity is 100 percent in example 11 and 80 percent in example 12.

The lower superficial gas velocity in the first reactor results in poorer catalyst productivity and a longer total average residence time in example 10 compared to example 7. The lower superficial gas velocity in examples 11 and 12 allows the monomer level in the first reactor to reach the maximum limit of 390 psi with a higher level of carbon monoxide addition compared to examples 8 and 9. The resulting fluidized bulk density is 6.6 pounds per cubic foot so the performance is better than for example 10, but not as good as examples 8 and 9.

The best overall performance is obtained by adjusting the level of carbon monoxide to obtain the maximum 390 psi monomer level in the first reactor while simultaneously adjusting the first reactor superficial gas velocity to minimize the fluid bulk density.

TABLE I

| Reactor | 1 | 2 | 3 |
|---|---|---|---|
| Split (% by weight) | 52 | 23 | 25 |
| Melt Flow (g/10 min) | 0.22 | 12.0 | 100 |
| Xylene Solubles | — | — | 1.8 |
| C3 Partial Pressure (psi) | 58 | 76 | 390 |
| H2/C3 molar ratio | 0.00027 | 0.00677 | 0.03718 |
| TEAL/Ti molar ratio | 45 | — | — |
| TEAL/SCA molar ratio | 4.12 | — | — |
| Prod. Rate (lbs/hr) | 26 | 11.5 | 12.5 |
| Throughput (lbs/hr) | 26 | 37.5 | 50 |
| SGV (ft/sec) | 1.10 | 1.10 | 1.10 |
| Fluid Bulk Density (lbs/cu ft) | 13.7 | 13.5 | 6.13 |
| Bed Weight (lbs) | 110 | 108 | 49 |
| Residence Time (hrs) | 4.22 | 2.88 | 0.98 |
| Catalyst Productivity (lbs/lb) | 1703 | 2456 | 3275 |

TABLE II

| Example | 1 | 2 | 3 | 4 | 5 | 6 |
|---|---|---|---|---|---|---|
| Deactivating Compound | | | | | | |
| Reactor 1 | no | yes | yes | yes | yes | yes |
| Reactor 2 | no | no | yes | yes | yes | yes |
| Reactor 3 | no | no | no | no | no | no |
| Productivity Recovery | | | | | | |
| Reactor 2 | — | 100% | — | — | — | — |
| Reactor 3 | — | 100% | 100% | 100% | 90% | 75% |
| Propylene Partial Pressure (psi) | | | | | | |
| Reactor 1 | 58 | 390 | 390 | 271 | 390 | 390 |
| Reactor 2 | 76 | 76 | 390 | 277 | 390 | 390 |
| Reactor 3 | 390 | 390 | 390 | 390 | 390 | 390 |
| SGV (ft/sec) | | | | | | |
| Reactor 1 | 1.10 | 1.10 | 1.10 | 1.10 | 1.10 | 1.10 |
| Reactor 2 | 1.10 | 1.10 | 1.10 | 1.10 | 1.10 | 1.10 |
| Reactor 3 | 1.10 | 1.10 | 1.10 | 1.10 | 1.10 | 1.10 |
| Fluid Bulk Density (lbs/cu ft) | | | | | | |
| Reactor 1 | 13.7 | 6.1 | 6.1 | 9.8 | 6.1 | 6.1 |
| Reactor 2 | 13.5 | 13.6 | 6.1 | 9.6 | 6.1 | 6.1 |
| Reactor 3 | 6.1 | 6.1 | 6.1 | 6.1 | 6.1 | 6.1 |
| Residence Time (hrs) | | | | | | |
| Reactor 1 | 4.22 | 1.89 | 1.89 | 3.02 | 1.89 | 1.89 |
| Reactor 2 | 2.88 | 2.89 | 1.31 | 2.05 | 1.31 | 1.31 |
| Reactor 3 | 0.98 | 0.98 | 0.98 | 0.98 | 0.98 | 0.98 |
| Total | 8.08 | 5.76 | 4.17 | 6.04 | 4.17 | 4.17 |
| Catalyst Productivity (lbs/lb) | | | | | | |
| Reactor 1 | 1703 | 2544 | 3503 | 2404 | 3133 | 2391 |
| Reactor 2 | 2456 | 3666 | 5052 | 3466 | 4518 | 3451 |
| Reactor 3 | 3275 | 4886 | 6736 | 4620 | 6024 | 4603 |

TABLE III

| Reactor | 1 | 2 |
|---|---|---|
| Split (% by weight) | 60 | 40 |
| Melt Flow (g/10 min) | 5.00 | 0.30 |
| Ethylene Content, (wt %) | 0.00 | 55 |
| Xylene Solubles | 3.0 | — |
| C3 Partial Pressure (psi) | 97.1 | 150 |
| H2/C3 molar ratio | 0.00693 | 0.05172 |
| C2/C3 Molar Ratio | — | 0.524 |
| TEAL/Ti molar ratio | 45 | — |
| TEAL/SCA molar ratio | 5.00 | — |
| Prod. Rate (lbs/hr) | 18000 | 12000 |
| Throughput (lbs/hr) | 18000 | 30000 |
| SGV (ft/sec) | 1.20 | 1.50 |
| Fluid Bulk Density (lbs/cu ft) | 12.3 | .8 |
| Bed Weight (lbs) | 49280 | 19620 |
| Residence Time (hrs) | 2.74 | 0.65 |
| Catalyst Productivity (lbs/lb) | 2278 | 3796 |

TABLE IV

| Example | 7 | 8 | 9 | 10 | 11 | 12 |
|---|---|---|---|---|---|---|
| Deactivating Compound | | | | | | |
| Reactor 1 | no | yes | yes | no | yes | yes |
| Reactor 2 | no | no | no | no | no | no |
| Carbon Monoxide in Propylene Feed (ppmv) | | | | | | |
| Reactor 1 | 0 | 0.64 | 0.90 | 0 | 1.0 | 1.6 |
| Reactor 2 | 0 | 0 | 0 | 0 | 0 | 0 |
| Productivity Recovery | | | | | | |
| Reactor 2 | — | 100% | 80% | — | 100% | 80% |
| Propylene Partial Pressure (psi) | | | | | | |
| Reactor 1 | 97.1 | 340 | 340 | 82.7 | 390 | 390 |
| Reactor 2 | 150 | 150 | 150 | 150 | 150 | 150 |
| SGV (ft/sec) | | | | | | |
| Reactor 1 | 1.20 | 1.20 | 1.20 | 0.90 | 0.90 | 0.90 |
| Reactor 2 | 1.50 | 1.50 | 1.50 | 1.50 | 1.50 | 1.50 |
| Fluid Bulk Density (lbs/cu ft) | | | | | | |
| Reactor 1 | 12.3 | 6.0 | 6.0 | 14.3 | 6.6 | 6.6 |
| Reactor 2 | 9.8 | 9.8 | 9.8 | 9.8 | 9.8 | 9.8 |
| Residence Time (hrs) | | | | | | |
| Reactor 1 | 2.74 | 1.33 | 1.33 | 3.18 | 1.46 | 1.46 |
| Reactor 2 | 0.65 | 0.65 | 0.65 | 0.65 | 0.65 | 0.65 |
| Total | 3.39 | 1.99 | 1.99 | 3.84 | 2.12 | 2.12 |
| Catalyst Productivity (lbs/lb) | | | | | | |
| Reactor 1 | 2278 | 3041 | 2696 | 2109 | 2950 | 2383 |
| Reactor 2 | 3796 | 5068 | 4493 | 3515 | 4917 | 3971 |

Notes to Tables:
1. Split (% by weight) = the percent by weight of the total resin produced in each reactor.
2. Melt Flow (g/10 min) = the melt flow is determined under ASTM D-1238, Condition E, at 230° C. under a load of 2.16 kilograms. It is reported in grams per 10 minutes.
3. Prod. Rate (lbs/hr) = rate of resin production in pounds per hour.
4. Throughput (lbs/hr) = rate of resin passing through reactor in pounds per hour.
5. SGV (ft/sec) = superficial gas velocity in feet per second.
6. Catalyst Productivity (lbs/lb) = the productivity of the catalyst precursor in pounds of polymer produced per pound of catalyst precursor. The value is cumulative.
7. Deactivating Compound = yes or no, whether or not a deactivating compound is used.

TABLE IV-continued

| Example | 7 | 8 | 9 | 10 | 11 | 12 |
|---------|---|---|---|----|----|----|

8. Carbon Monoxide in Propylene Feed (ppmv) = the amount of carbon monoxide added to the reactor on an equivalence basis to that amount of carbon monoxide in the propylene feed to the reactor in parts per million by volume.
9. Productivity Recovery = the percent of residual catalyst productivity recovered in a reactor following the use of a deactivating agent in a previous reactor.
10. Fluid Bulk Density (lbs/cu ft) = the apparent bulk density of the polymer particles in the fluid bed in pounds per cubic feet.
11. Residence Time (hrs) = the time, in hours, that the resin resides in each reactor. The total residence time is also given.
12. Propylene Partial Pressure (psi) = the propylene partial pressure. 390 psi is selected as the maximum propylene partial pressure because of the maximum working pressure of the reactors and the dew point of the cycle gas mixture, i.e., to prevent the gas mixture from condensing in the fluidized bed.

I claim:
1. A process for the production of polypropylene comprising continuously contacting propylene or a mixture comprising propylene and one or more other alpha-olefins, in two or more reaction zones connected in series, under gas phase polymerization conditions, with a catalyst system comprising (i) a solid particulate catalyst precursor, which includes magnesium; titanium; a halogen which is chlorine, bromine, or iodine, or mixtures thereof; and, as an inside electron donor, a carboxylic acid ester; (ii) a hydrocarbylaluminum cocatalyst; and (iii) as an outside electron donor, a silicon compound containing at least one silicon-oxygen-carbon linkage or a carboxylic acid ester, subject to the following conditions:

(a) introducing the catalyst precursor into the first reaction zone only;

(b) in the first reaction zone or in a first series of two or more reaction zones, partially deactivating the catalyst precursor with a deactivator and simultaneously increasing the monomer level wherein the deactivation and the increase in monomer level are effected in sufficient amounts to achieve a desired resin productivity in the first reaction zone(s);

(c) transferring resin product together with catalyst precursor residue from the first reaction zone or the last reaction zone of the first series of reaction zones to a second reaction zone (A) having purged the deactivator in a purge zone prior to the entry of the precursor residue into the second reaction zone and/or (B) adding cocatalyst, as an activator, and/or another activator to the purge zone or the second reaction zone wherein the activation is effected in sufficient amount to achieve a desired resin productivity in the second reaction zone; and (d) optionally, repeating steps (b) and/or (c) in one or more succeeding reaction zones.

2. The process defined in claim 1 wherein the catalyst precursor is deactivated by about 5 to about 90 percent and the monomer level is increased by about 5 to about 500 percent based upon the normal activity for said catalyst precursor and the corresponding normal monomer level.

3. The process defined in claim 1 wherein one or more of the reaction zones are fluidized beds.

4. The process defined in claim 1 wherein the inside electron donor is a polycarboxylic acid ester containing two coplanar ester groups attached to adjacent carbon atoms.

5. The process defined in claim 1 wherein the hydrocarbyl aluminum cocatalyst is a trialkylaluminum.

6. The process defined in claim 1 wherein the outside electron donor is a silicon compound having the formula:

$$R_aSiY_bX_c$$

wherein R is a hydrocarbon radical having 1 to 20 carbon atoms; Y is —OR or —OCOR; and X is hydrogen, chlorine, bromine, or iodine; each R and Y are the same or different; a is an integer from 0 to 3; b is an integer from 1 to 4; c is 0 or 1; and a+b+c=4.

7. A process for the production of polypropylene comprising continuously contacting propylene or a mixture comprising propylene and one or more other alpha-olefins having 2 or 4 to 8 carbon atoms, in two reaction zones connected in series, under gas phase polymerization conditions, with a catalyst system comprising (i) a solid particulate catalyst precursor, which includes magnesium; titanium; a halogen which is chlorine, bromine, or iodine, or mixtures thereof; and, as an inside electron donor, a polycarboxylic acid ester containing two coplanar ester groups attached to adjacent carbon atoms; (ii) a hydrocarbylaluminum cocatalyst; and (iii) as an outside electron donor, a silicon compound having the formula:

$$R_aSiY_bX_c$$

wherein R is a hydrocarbon radical having 1 to 20 carbon atoms; Y is —OR or —OCOR; and X is hydrogen, chlorine, bromine, or iodine; each R and Y are the same or different; a is an integer from 0 to 3; b is an integer from 1 to 4; c is 0 or 1; and a+b+c=4, subject to the following conditions:

(a) introducing the catalyst precursor into the first reaction zone only;

(b) in the first reaction zone, partially deactivating the catalyst precursor with a deactivator by about 5 to about 90 percent and simultaneously increasing the monomer level by about 5 to about 500 percent based upon the normal activity for said catalyst precursor and the corresponding normal monomer level wherein the deactivation and the increase in monomer level are effected in sufficient amounts to achieve a desired resin productivity in the first reaction zone;

(c) transferring resin product together with catalyst precursor residue from the first reaction zone to the second reaction zone (A) having purged the deactivator in a purge zone prior to the entry of the precursor residue into the second reaction zone and/or (B) adding cocatalyst, as an activator, and/or another activator to the purge zone or the second reaction zone wherein the activation is effected in sufficient amount to achieve a desired resin productivity in the second reaction zone.

8. A process for the production of polypropylene comprising continuously contacting propylene or a mixture comprising propylene and one or more other alpha-olefins having 2 or 4 to 8 carbon atoms, in three reaction zones connected in series, under gas phase polymerization conditions, with a catalyst system comprising (i) a solid particulate catalyst precursor, which includes magnesium; titanium; a halogen which is chlorine, bromine, or iodine, or mixtures thereof; and, as an inside electron donor, a polycarboxylic acid ester containing two coplanar ester groups attached to adjacent carbon atoms; (ii) a hydrocarbylaluminum cocatalyst; and (iii) as an outside electron donor, a silicon compound having the formula:

$$R_aSiY_bX_c$$

wherein R is a hydrocarbon radical having 1 to 20 carbon atoms; Y is —OR or —OCOR; and X is hydrogen, chlorine, bromine, or iodine; each R and Y are the same or different; a is an integer from 0 to 3; b is an integer from 1 to 4; c is 0 or 1; and a+b+c=4, subject to the following conditions:

(a) introducing the catalyst precursor into the first reaction zone only;

(b) in the first reaction zone, partially deactivating the catalyst precursor with a deactivator by about 5 to about 90 percent and simultaneously increasing the monomer level by about 5 to about 500 percent based upon the normal activity for said catalyst precursor and the corresponding normal monomer level wherein the deactivation and the increase in monomer level are effected in sufficient amounts to achieve a desired resin productivity in the first reaction zone;

(c) transferring resin product together with catalyst precursor residue from the first reaction zone to the second reaction zone, partially deactivating the catalyst precursor with a deactivator by about 5 to about 90 percent and simultaneously increasing the monomer level by about 5 to about 500 percent based upon the normal activity for said catalyst precursor and the corresponding normal monomer level wherein the deactivation and the increase in monomer level are effected in sufficient amounts to achieve a desired resin productivity in the second reaction zone;

(d) transferring resin product together with catalyst precursor residue from the second reaction zone to the third reaction zone (A) having purged the deactivator in a purge zone prior to the entry of the precursor residue into the third reaction zone and/or (B) adding cocatalyst, as an activator, and/or another activator to the purge zone or the third reaction zone wherein the activation is effected in sufficient amount to achieve a desired resin productivity in the third reaction zone.

* * * * *